(12) United States Patent
Mogili

(10) Patent No.: US 6,532,523 B1
(45) Date of Patent: Mar. 11, 2003

(54) APPARATUS FOR PROCESSING MEMORY ACCESS REQUESTS

(75) Inventor: Ramesh Mogili, Santa Clara, CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/417,272

(22) Filed: Oct. 13, 1999

Related U.S. Application Data (63) Continuation-in-part of application No. 09/302,567, filed on Apr. 30, 2000.

(51) Int. Cl.[7] ............................ G06F 13/00; G06F 12/00
(52) U.S. Cl. ............................ 711/168; 711/167; 711/5
(58) Field of Search ...................... 711/5, 147, 150, 711/167, 168, 169

(56) References Cited

U.S. PATENT DOCUMENTS

| | | | | | |
|---|---|---|---|---|---|
| 5,323,489 A | * | 6/1994 | Bird | ............................ | 711/157 |
| 5,367,494 A | * | 11/1994 | Shebanow et al. | ..... | 365/230.03 |
| 5,623,628 A | * | 4/1997 | Brayton et al. | ............... | 710/39 |
| 5,701,434 A | * | 12/1997 | Nakagawa | .................... | 711/138 |
| 5,875,470 A | * | 2/1999 | Dreibelbis et al. | .......... | 711/105 |
| 6,226,724 B1 | * | 5/2001 | Biggs | .......................... | 711/158 |
| 6,243,797 B1 | * | 6/2001 | Merritt | ........................ | 711/167 |

\* cited by examiner

*Primary Examiner*—Do Hyun Yoo
*Assistant Examiner*—Yamir Encarnación
(74) *Attorney, Agent, or Firm*—John F. Schipper; Bobby K. Truong

(57) ABSTRACT

Apparatus for processing memory access requests includes first and second state machines for controlling access to first and second memory banks and an arbiter. While the first state machine is processing a current memory access request for the first memory bank, the arbiter recieves a next memory access and determines wheather the next memory access request will interfere with the processing of the current memory access request. If no interference will occur, and if the next access request is directed to the second memory bank, the second state machine begins processing he next memory access request before completion of processing of the current memory access request. The second state machine begins processing of the next memory access request during a mandatory wait period implemented by the first state machine. The first and second state machines process the current and next memory access request concurrently.

18 Claims, 9 Drawing Sheets

Fig. 6B

APPARATUS FOR PROCESSING MEMORY ACCESS REQUESTS

This is a Continuation-in-part of copending application Ser. No. 09/302,567, filed Apr. 30, 2000, which is now pending.

BACKGROUND OF THE INVENTION

1. Field of the Invention

This invention relates generally to computer memory and more particularly to an apparatus for processing memory access requests involving multiple banks of SDRAM memory.

2. The Background Art

Modern electronic systems utilizing Synchronous Dynamic Random Access Memory (SDRAM) for temporary data storage often employ one or more memory devices. Typical memory arrays are thought of as being rectangular, with a given memory cell in an array being accessed when the proper row and column lines are asserted.

In order for a device to access memory, the device typically provides required information to a memory manager, and the memory manager then interacts with the memory device to perform the required operation. The memory manager is responsible for determining which memory component to interact with for the desired operation, and then performing the operation in the correct manner. Thus, the device requesting the operation typically does not know the physical characteristics of the memory, whether other devices have initiated other memory operations, etc. However, the throughput devices requiring memory operations are greatly affected by the throughput of those memory operations.

Typical memory devices are organized in banks of memory cells. It is normal for data pertaining to a given device to span more than one bank. Further, devices commonly access data without regard to the bank in which that data is stored. Therefore, a device may first access data stored in one bank and then access data in a second bank in the following operation.

Prior art memory managers operate on each bank of memory in serial fashion. Using a prior art apparatus, a read or write operation involving one bank of memory must be fully completed prior to a succeeding operation on a different bank being initiated. As those of ordinary skill in the art are readily aware, a typical write operation involves a row command, a column command, and a precharge command. Correspondingly, a read operation typically involves a row command, a column command, two wait cycles while data is retrieved from memory, and a precharge command.

Although performing memory operations in serial fashion is useful for its intended purpose, prior art memory operations are not performed at the highest possible throughput. Therefore, the devices requiring these operations do not operate at their peak efficiency, due to the less than optimal efficiency of the memory operations.

It would therefore be beneficial to provide an apparatus and method for performing memory operations at a higher throughput than the prior art.

SUMMARY OF THE INVENTION

The present invention provides an improved apparatus for processing memory access requests, the apparatus comprising a first state machine for controlling access to a first memory bank, a second state machine for controlling access to a second memory bank, and an arbiter. According to the invention, while the first state machine is processing a current memory access request to access the first memory bank, the arbiter receives a next memory access request. In response, the arbiter determines whether the next memory access request will interfere with the processing of the current memory access request. If the next memory access request will not interfere with the processing of the current memory access request, and if the next request is directed to the second memory bank, then the second state machine is allowed to begin processing of the next memory access request prior to the completion of the processing of the current memory access request by the first state machine. In one embodiment, the second state machine begins processing of the next memory access request during one or more of the mandatory wait periods implemented by the first state machine. Thus, the first and second state machines are allowed to process the current and next memory access requests concurrently. By taking advantage of the wait periods of one state machine to get an early start for another state machine, the present invention significantly reduces the amount of wait time required in processing memory access requests. This in turn significantly improves the throughput and the overall efficiency of the memory system.

DETAILED DESCRIPTION OF THE EMBODIMENT(S)

Those of ordinary skill in the art will realize that the following description of the present invention is illustrative only and not in any way limiting. Other embodiments of the invention will readily suggest themselves to such skilled persons.

Figure 1:
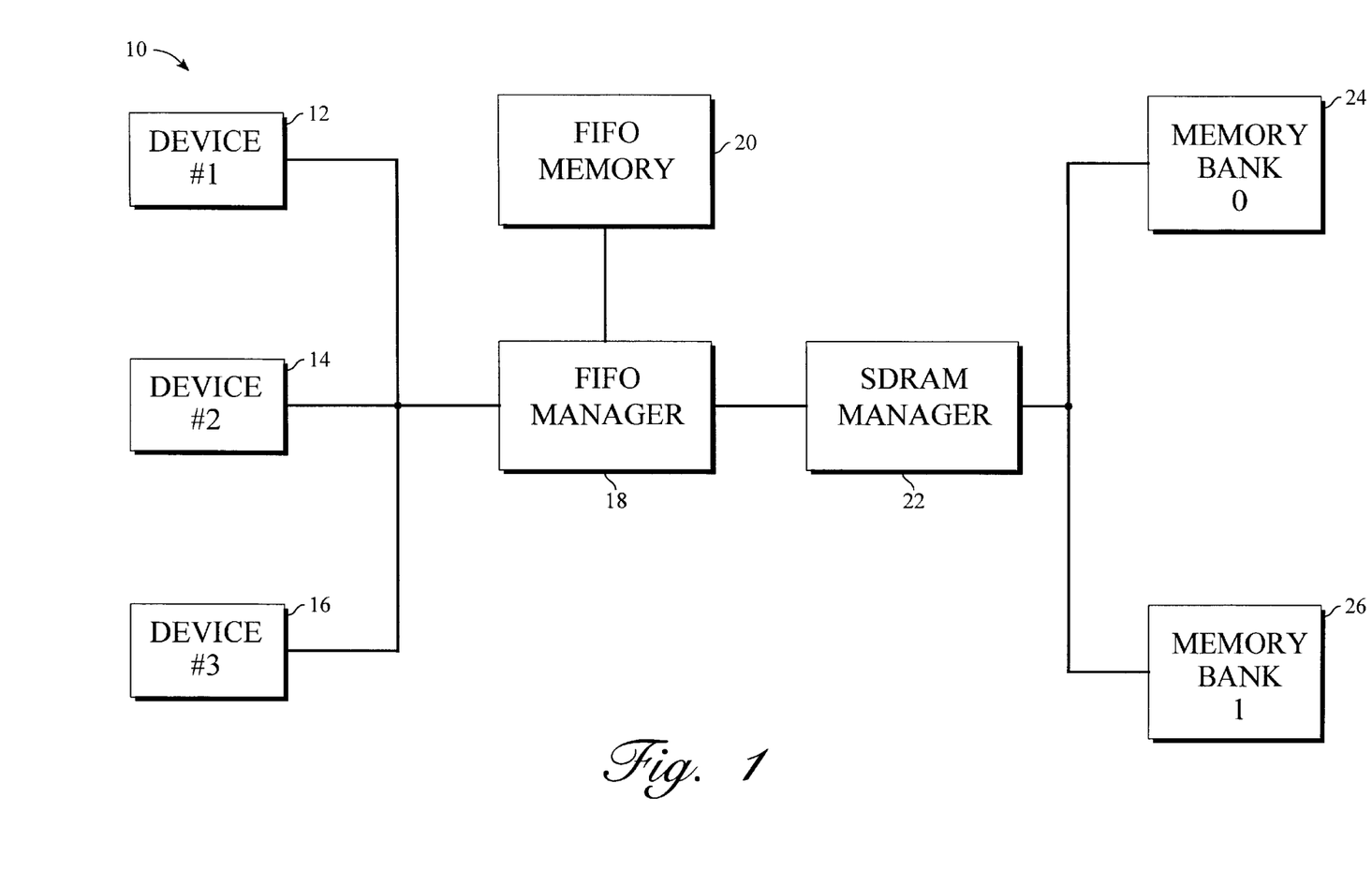
FIG. 1 is a block diagram of an electronic system incorporating the present invention.

FIG. 1 is a block diagram of an electronic system incorporating the present invention.

Referring to FIG. 1, system 10 includes devices 12, 14, and 16 which require access to SDRAM memory for read and/or write operations. Information such as address, data, whether the operation desired is a read or write operation, and other required information is sent from a device and is temporarily stored by first-in, first-out (FIFO) manager 18 into FIFO memory 20. In one embodiment, FIFO memory 20 is large enough to hold four complete command sets. However, the size of the FIFO is determined by the number of devices accessing memory and the read and write clock speeds. It is contemplated that FIFO memory sized to store as few as two command sets may be needed in a small system, or alternatively sized to store as any as twenty or more command sets in larger systems.

As SDRAM manager 22 becomes available to receive information, data from FIFO 20 is transferred to SDRAM manager 22 on a first-in, first-out basis.

SDRAM manager provides the proper signals to memory banks 24 or 26 which cause the desired read or write operations to take place. Although only two banks of memory are shown, those or ordinary skill in the art having knowledge of this disclosure would be readily aware how to adapt the present invention to operate other numbers of banks of memory.

For example, when using two banks of memory with two state machines, a single bit in the memory address is used to determine which state machine to cause to perform a given request. In an embodiment having two state machines and four banks of memory, a second address bit may be examined in order to determine which bank of memory is involved. A default state machine may be designated which operates on a first request, the second state machine being held in reserve to operate on requests to banks of memory other than the bank being operated on by the first state machine. The arbiter may be modified to track which state machine is in use during any given time interval and assign the other state machine, if available, to operate on a different pending request.

Figure 2A:
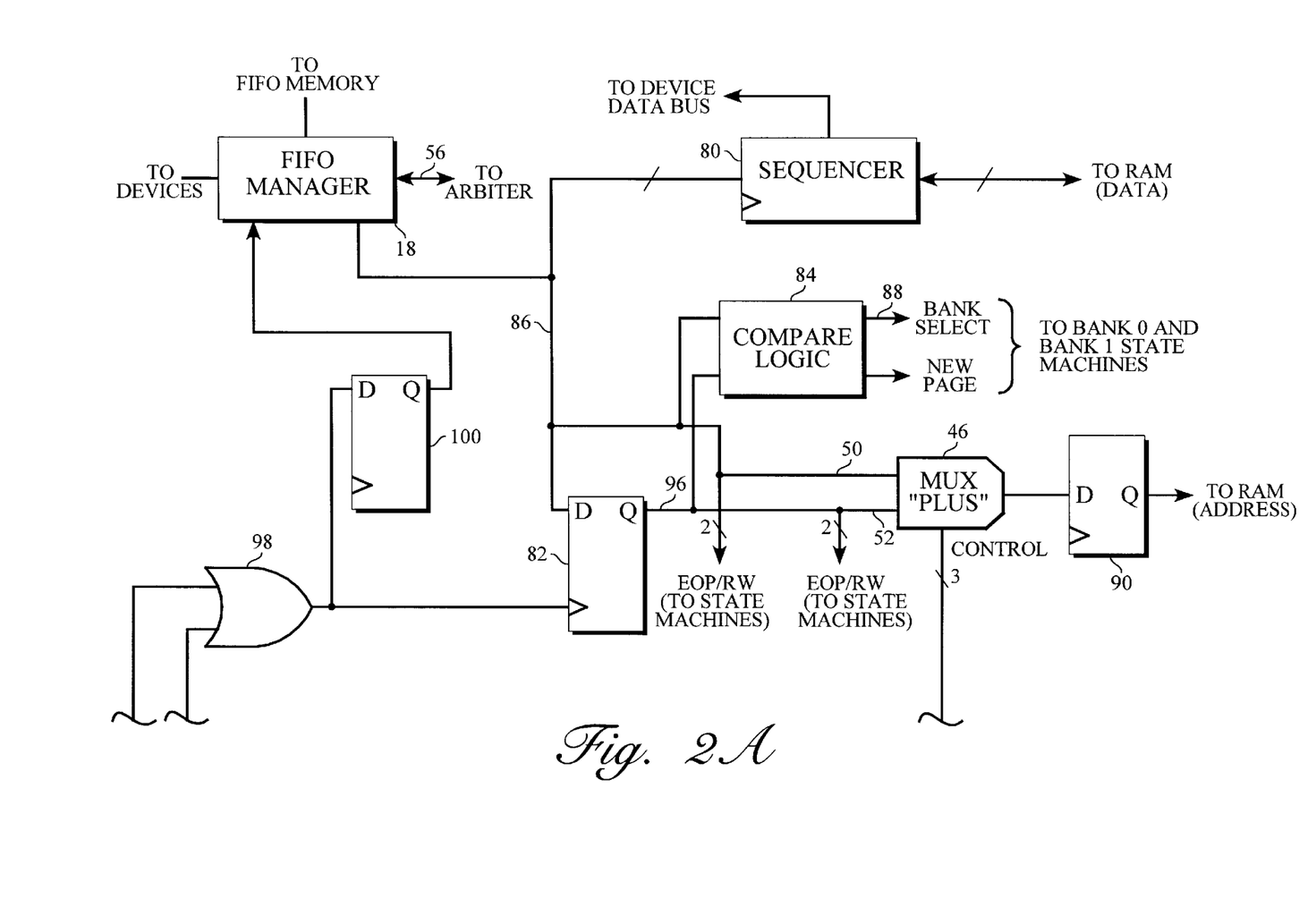
FIGS. 2A and 2B together are a block diagram of a present invention SDRAM manager.
Figure 2B:
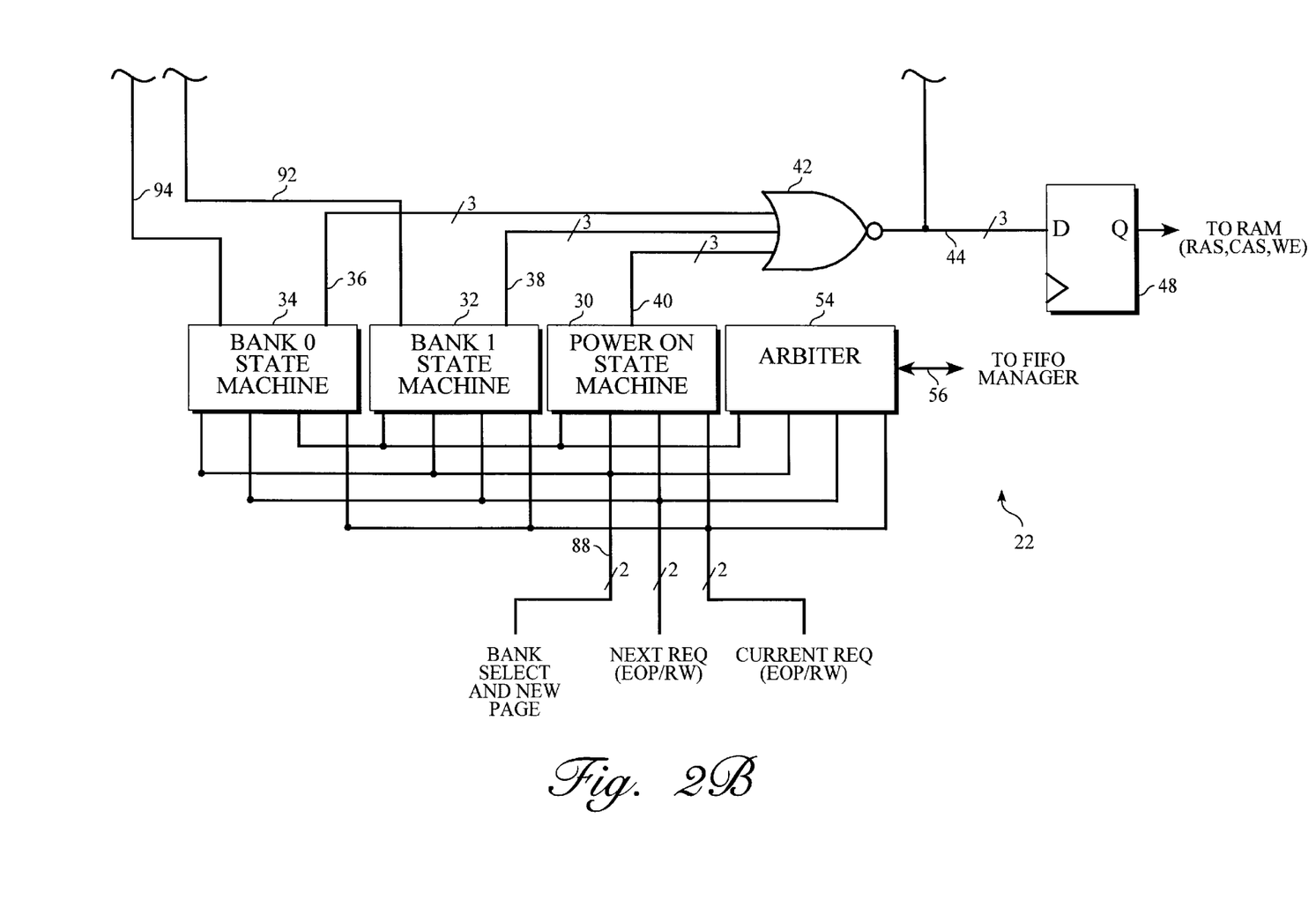

FIG. 2 is a block diagram of a present invention SDRAM manager. Present invention SDRAM manager 22 provides an apparatus which includes a power-on state machine 30, and two state machines 32 and 34, one for each bank of memory utilized in FIG. 1.

Control line groups 36, 38, and 40, each group representing Row Address Strobe (RAS), Column Address Strobe (CAS), and Write Enable (WE) for each state machine, are provided to NOR gate 42. The three-bit output of NOR gate 42 is simply the NOR'd combination of each group of three lines. For example, the RAS line from each of the state machines is tested to determine if any of them provides a binary "high". If so, that particular one of the three outputs from NOR gate 42 representing the RAS is low. The CAS and WE inputs from the state machines are handled in a like manner, and NOR gate 42 provides all three outputs as control lines 44 to MUX 46 and as inputs to flip-flop 48.

MUX 46 is very similar to a traditional multiplexer having a nonlinear decoding scheme. One of two different input buses 50 and 52 is selected to be passed to the output based on whether certain combinations of control lines 44 are asserted. A truth table for MUX 46 appears as Table 1 below. Input lines 50 and 52 will be discussed more fully when the operation of the apparatus is discussed in later paragraphs.

TABLE 1

| Command | Control Lines RAS | CAS | WE | Control Lines (in decimal) | Output of MUX 46 |
|---|---|---|---|---|---|
| Mode | 0 | 0 | 0 | 0 | Assert all zero's on output |
| Refresh | 0 | 0 | 1 | 1 | don't care, output ignored |
| Precharge | 0 | 1 | 0 | 2 | don't care, output ignored |
| Row Activate | 0 | 1 | 1 | 3 | Input lines 52 |

TABLE 1-continued

| Command | Control Lines RAS | CAS | WE | Control Lines (in decimal) | Output of MUX 46 |
|---|---|---|---|---|---|
| Write | 1 | 0 | 0 | 4 | input lines 50 |
| Read | 1 | 0 | 1 | 5 | input lines 50 |
| N/A | 1 | 1 | 0 | 6 | illegal condition |
| NOP | 1 | 1 | 1 | 7 | don't care, output ignored |

The operation of other components of SDRAM manager 22 will be described as the operation of SDRAM manager is presented.

At any time when one or more requests for memory operations are present in FIFO memory 20 of FIG. 1, FIFO manager 18 signals arbiter 54 over signal line 56 that a request is pending. An example of three such requests which will be described herein with respect to the present invention appear in FIG. 3 as first request 58, second request 60, and third request 62.

Figure 3:
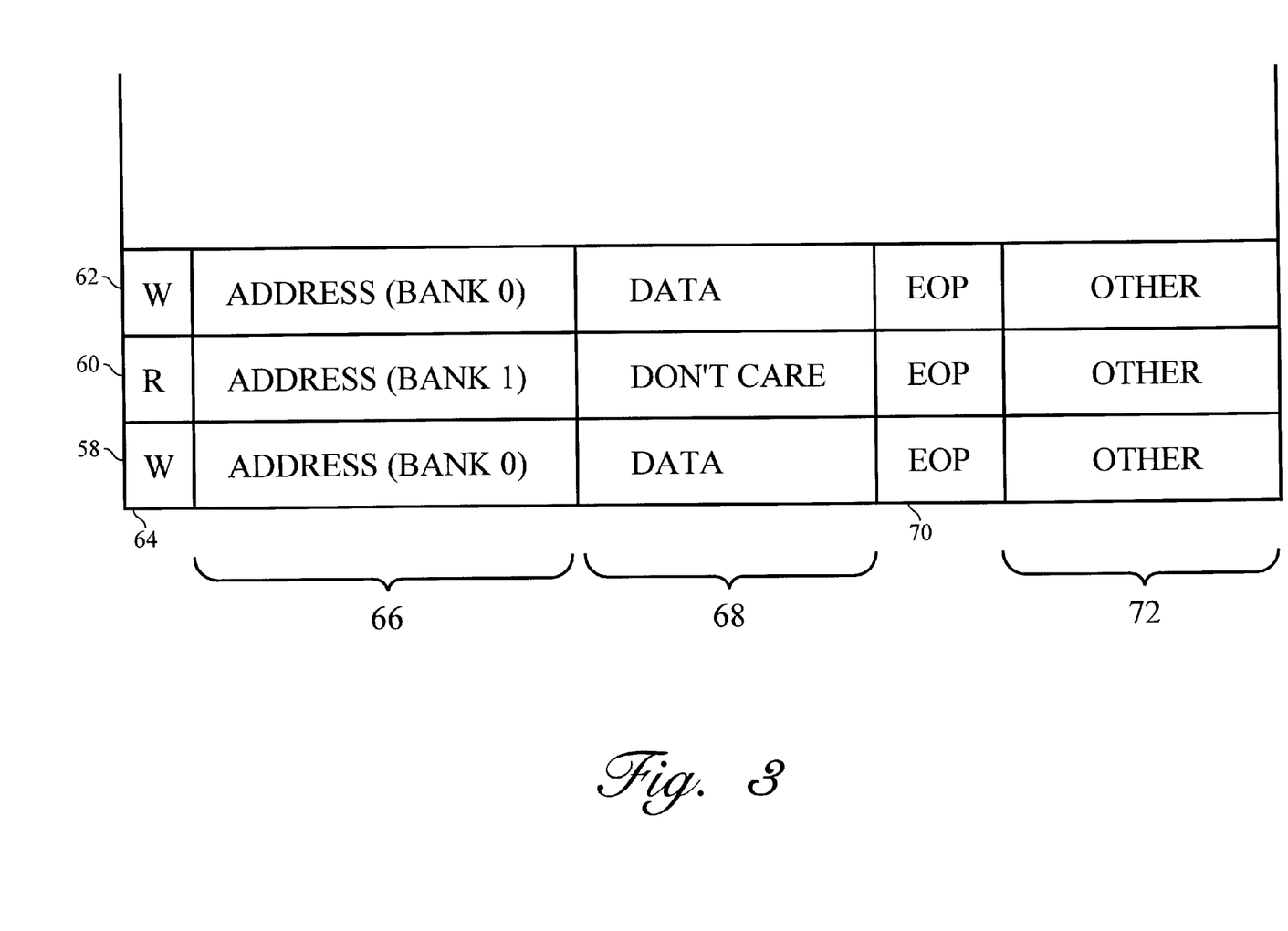
FIG. 3 is an example of memory request in a first-in, first-out memory.

Turning to FIG. 3 briefly, each request (58, 60, and 62) includes three bits 64 which designate the desired operation (through the control lines) as a read, write, precharge, refresh, etc., as defined above in Table 1. Also included in each request are address bits 66 which define the address of the memory block involved in the desired operation. For write requests, data 68 to be written into the memory block is also provided. As is known by those of ordinary skill in the art, read operations request data to be provided to a device from memory, and therefore, no data is provided by a device in the request.

If the operation requested only involves a single address, such as when writing one data element to memory, an EOP bit 70 provided in the FIFO data is asserted, thus indicating that the present operation is the last one in a series of one or more operations. Operations by a device which span only one bank and involve the same page of memory may be strung together. All other operations must have the EOP bit asserted.

Finally, other data may be provided in the FIFO data such as the channel number, device address, and a write protect bit.

Turning back to FIG. 2, after arbiter 54 receives an indication of a pending operation from FIFO, a determination is made by the arbiter of whether the "next" operation will interfere with currently pending operations. For the purpose of this disclosure, any request which is being processed shall be referred to as a current request, and a request which is the next entry in the FIFO memory and which follows a current request shall be referred to as a "next" request. Therefore, in FIG. 3, request 58, when being processed, is the current request, and request 60 is the next request. Similarly, when request 58 is complete and request 60 is being processed, request 60 becomes the current request and request 62 is the next request.

Using the FIFO data of FIG. 3, when request 58 arrives in FIFO memory, FIFO manager 18 provides the entire set of data contained in request 58 to the inputs of sequencer 80, flip-flop 82, and compare logic 84 on lines 86. Compare logic 84 examines the address within request 58 to determine the bank to which the request pertains. Individual bank select lines 88 is provided between compare logic 84 and each respective bank state machine, shown here as state machines 32 and 34. The proper bank select line corresponding to the state machine to which the request pertains is asserted to signal the associated state machine that the next request must be processed by it.

After being signaled, the proper state machine 32 and 34 causes two things to happen. First, the proper ones of RAS, CAS, and WE lines are asserted causing NOR gate 42 to provide one of the outputs defined in Table 1 above. Read or write operations are always preceded by a ROW ACTIVATE command which, as Table 1 indicates, selects input 50 of MUX 46 to be presented at the input of flip-flop 90.

Compare Logic 84 compares the addresses presented on inputs 50 and 52 to determine if the current request and the next request both involve the same row in the memory array, and also determines the bank to which the request pertains. If both the current and next requests involve the same bank, the newpage line which couples the compare logic to each bank state machine is deasserted. If the current and next requests involve different banks, the newpage line is asserted, indicating to the proper state machine that a ROW ACTIVATE command must be asserted at the beginning of the next command sequence. If the "next" request is also the first request as would be when processing request 58 of FIG. 3, there is no current request, causing compare logic 84 to assert the bank select and new page lines for the proper bank.

As will be seen in a later description of how a state machine acts on a given request, a wait of one or more clock cycles, and then the assertion of a read or write command follows the assertion of a ROW ACTIVATE command. However, the state machine which initiated the ROW ACTIVATE command asserts one of lines 92 or 94 for one clock cycle which clocks flip flop 82 to move the data associated with the request to the output 96 of flip-flop 82.

Asserting either line 92 or 94 also notifies FIFO manager 18 through OR gate 98 and flip-flop 100 that the most recent request has been acted upon, and to thus delete the first entry in FIFO memory and move each remaining entry one step closer to the output side of the FIFO memory.

When the state asserts a read or write command, the control input to MUX 46 causes the information on input 52 to be selected to pass to flip-flop 90. Again, on the rising edge of the system clock cycle following that write or read command being asserted, the RAS, CAS, and WE data, together with the address data, is presented to the proper memory bank 24 or 26 of FIG. 1.

For write operations, sequencer 80 synchronizes the timing of column address signals being sent to memory with the actual assertion of write data on the RAM memory data lines. As those of ordinary skill in the art as readily aware, the first 32 bits of data represented when the write command is issued to the RAM, and the second 32 bits of data are asserted one clock cycle later.

For read operations, sequencer 80 tracks the device numbers of the devices requesting data and the order in which the read requests were presented to the memory. As data arrives from the memory back to the sequencer, that data is matched with the number of the device and then sent to that device.

Figure 4:
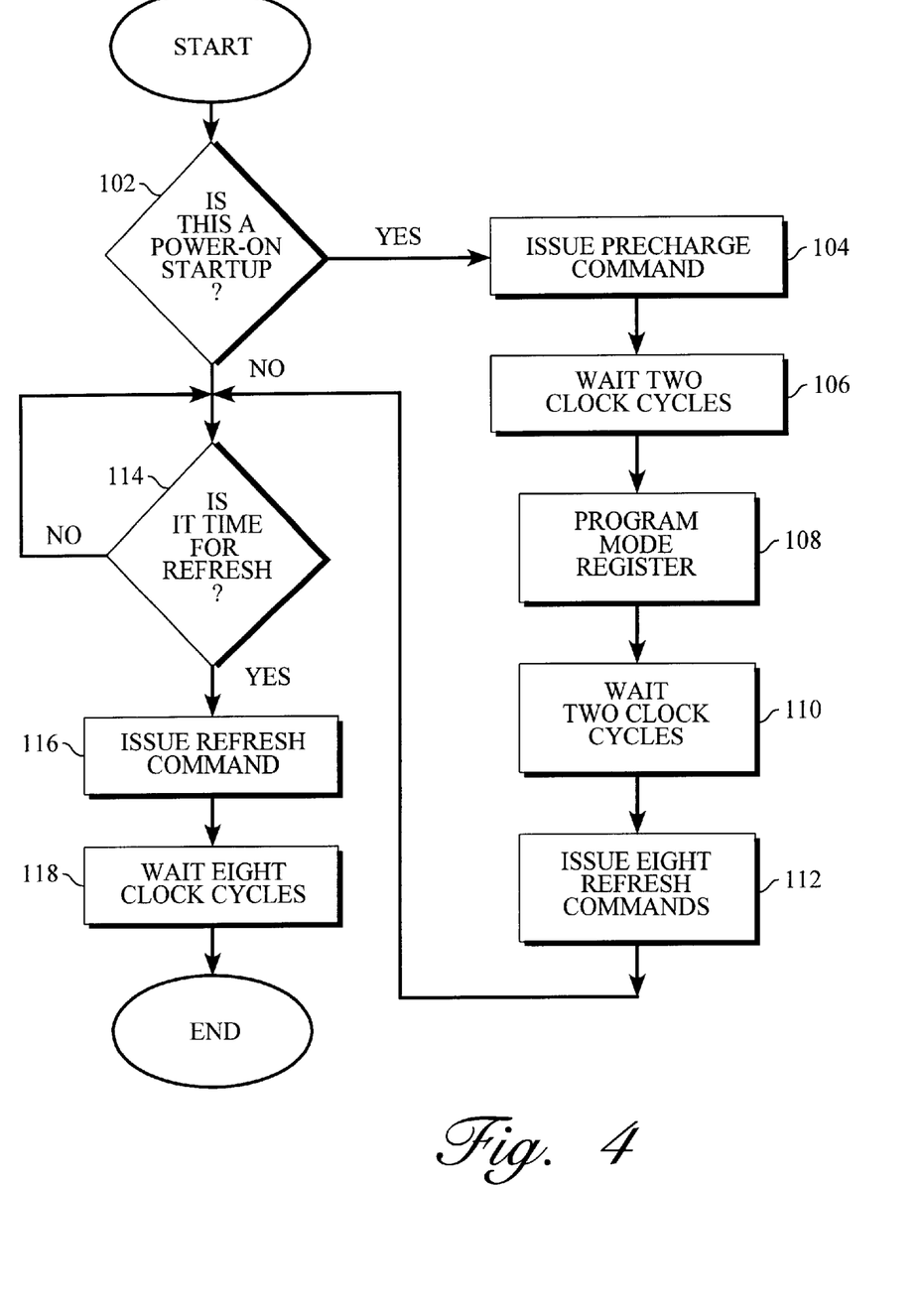
FIG. 4 is a flowchart which describes a method of the present invention for handling a power on condition in an SDRAM memory device.

FIG. 4 is a flowchart which describes a method of the present invention for handling a power on condition in an SDRAM memory device. Referring to FIG. 4, the method begins at block 102 where a determination of whether the state machine is acting as a result of being powered up. If yes, at block 104 the state machine issues a precharge command for both banks of memory so that the memory arrays included therein will become ready for memory operations.

Following the precharge command, the state machine waits at block 106 for two clock cycles for the command to be completed by the memory devices, and then programs the mode register at block 108. As is well-known to those of ordinary skill in the art, the mode register is programmed with information relating to the operation of the particular SDRAM memory employed. Such information may include clock latency, burst length, and other information.

The method proceeds at block 110 with another wait for two clock cycles, followed by block 112 where eight refresh commands are issued for each bank of memory being employed.

Following the completion of block 112, the state machine goes into a "normal" mode where it is only responsible for issuing refresh commands. At block 114 it is determined whether it is time for a refresh to occur. If yes, the method proceeds with block 116 where the state machine issues a refresh command to both banks of memory. Prior to the refresh command actually issuing, arbiter 54 must determine whether the refresh command will interfere with a pending operation of a different state machine. If an interference would occur, the refresh operation is delayed until the current operation is completed.

At block 118, the state machine has a mandatory wait of eight clock cycles before issuing any further commands, while the refresh command is executed.

Figure 5A:
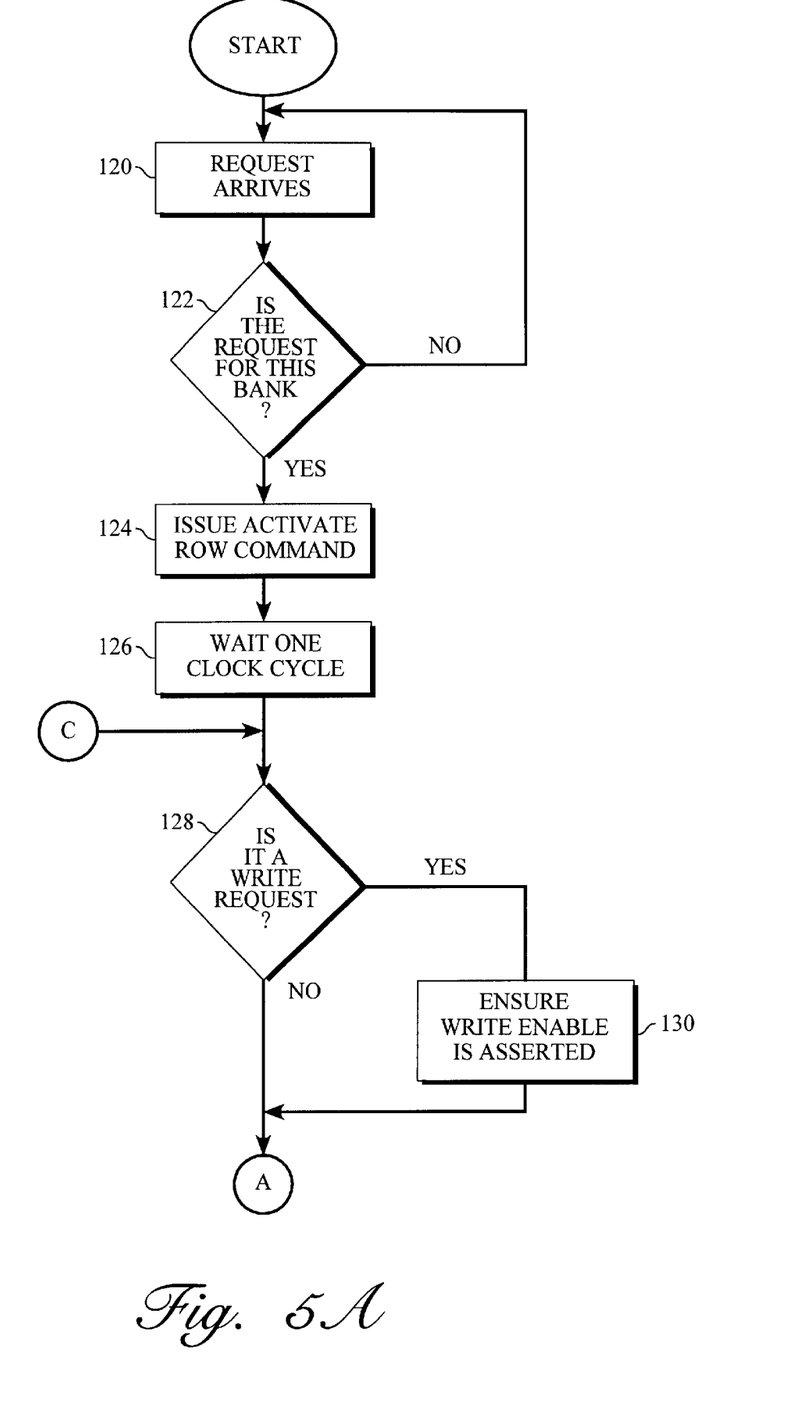
FIGS. 5A, 5B, and 5C together are a flowchart which describes a method of the present invention describing how a memory state machine processes read and write operations in an SDRAM memory device.
Figure 5B:
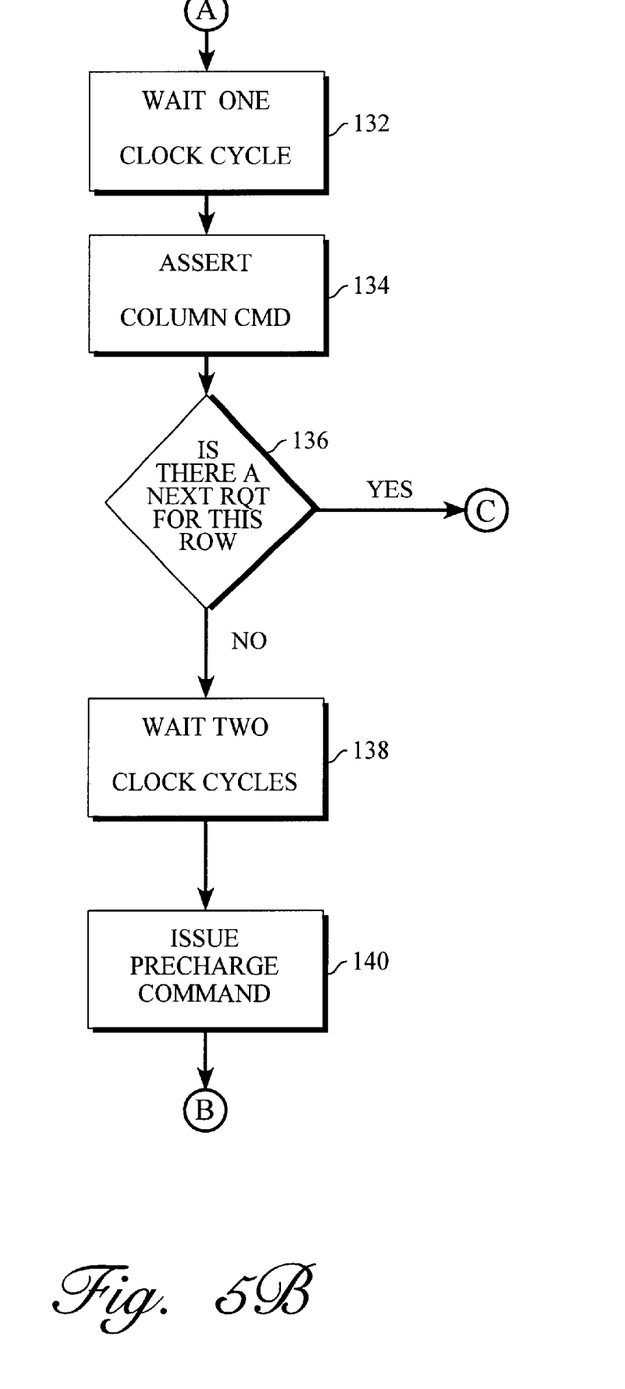
Figure 5C:
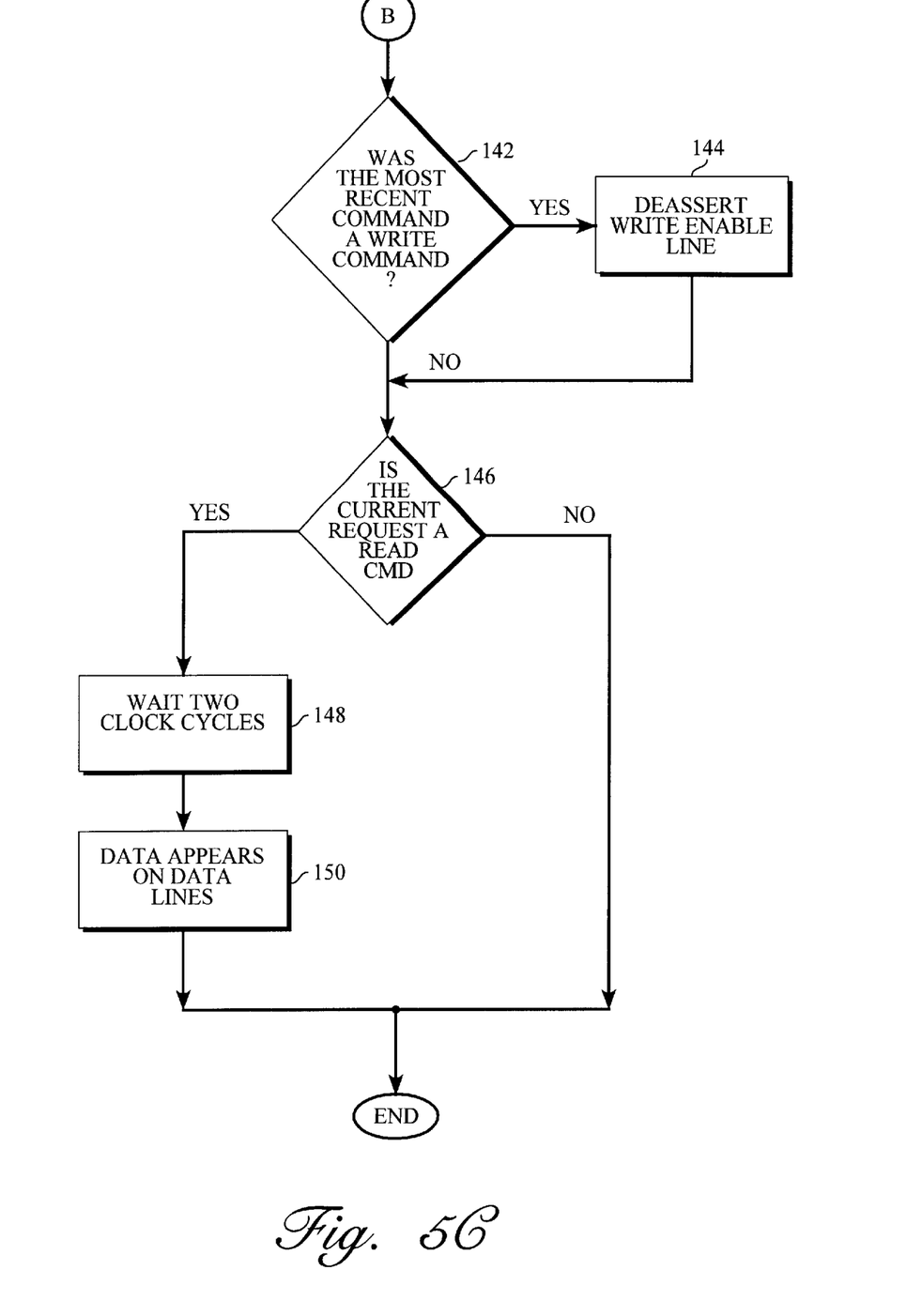

FIGS. 5A, 5B, and 5C together are flowchart which describes a method of the present invention showing how a memory state machine processes read and write operations in an SDRAM memory device.

Referring to FIGS. 5A, 5B, and 5C, at block 120 a request for a memory operation arrives at a state machine. At block 122, the request is evaluated to determine whether the request pertains to memory addresses handled by this state machine. If yes, the method proceeds with block 124 where a row activate command is issued for the row address which accompanies the request.

At block 126, a mandatory wait of one clock cycle takes place. At block 128 it is determined whether the request being processed is a write request. If yes, the method proceeds at block 130 when the write enable line is asserted. If no, the method proceeds form block 128 to block 132 without enabling the write enable line.

At block 132, another mandatory wait of one block cycle takes place.

At block 134, a column command is asserted together with the column address which accompanied the request. Column commands include the read and write commands previously seen in Table 1.

At block 136, it is determined whether the next request pertains to the same row as the current request. If no, a mandatory wait of two clock cycles takes place at block 138 while the memory array processes the column request. If yes, the method proceeds with block 128 as previously described.

At block 140, the request is completed when the state machine issues a precharge command thus preparing the memory bank for the next request. At block 142, it is determined if the most recent request was a write request, the write enable line is deasserted at this time. If yes, the method proceeds at block 146 where the write enable line is deasserted. If no, the method proceeds at block 148 without deasserting the write enable line.

At block 146 it is determined if the most recent request was a read command. If yes, there is a two clock cycle wait at block 148 for the requested data to appear on the data lines at block 150. If not, no wait is necessary and the method ends.

Figure 6A:
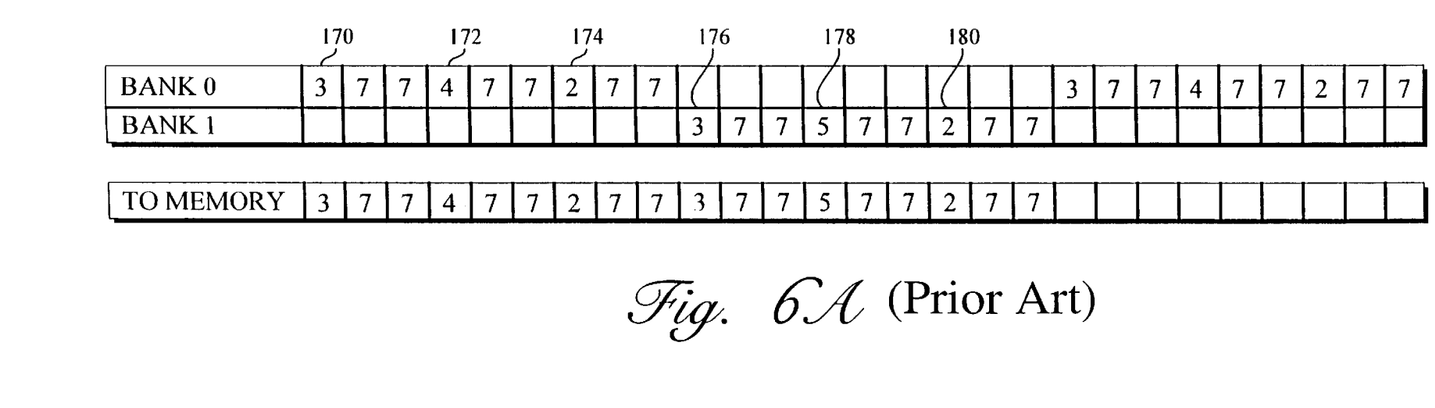
FIG. 6A is a prior art timing diagram showing the order and timing of the commands issued with respect to the requests in FIG. 3.
Figure 6B:
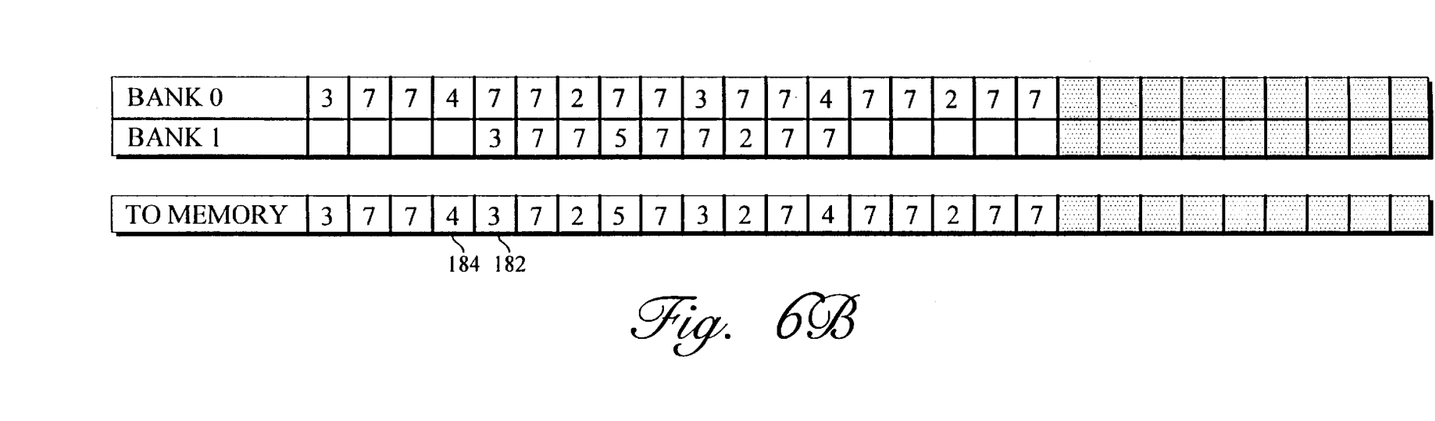
FIG. 6B is a timing diagram for the present invention showing the order and timing of the commands issued with respect to the requests of FIG. 3.

A specific example of the three memory requests will now be presented with respect to FIGS. 6A and 6B.

FIG. 6A is a timing diagram showing the order and timing of the commands issued with respect to the requests of FIG. 3 in a prior art apparatus. FIG. 6B is a timing diagram showing the order and timing of the commands issued with respect to the requests of FIG. 3 in an apparatus according to the present invention.

In FIGS. 6A and 6B, the decimal numerals such as 3, 7, 4, and 2 represent commands which have been issued by a state machine prior to being processed by NOR gate 42. These decimal numerals directly correspond with the decimal representation of state machine commands seen previously in Table 1.

The timing diagrams described herein reflect commands as they are issued prior to inversion by NOR gate 42. Referring to FIG. 3 and FIG. 4A, the first memory operation requested applies to Bank 0, and is a write operation involving one address. Since read and write operations must be preceded by a ROW ACTIVATE command, that command is issued by the proper state machine when the arbiter determines that the command will not interfere with commands already in process.

Following the assertion of ROW ACTIVATE command 170, the state machine waits for two clock cycles, the time required for the memory device to complete the command.

Write command 172 is then issued by the state machine, followed by another two cycle wait period, and precharge command 174. Following the precharge command 174, the single prior art state machine issues a ROW ACTIVATE command 176 for bank 1.

Again, two clock cycles following ROW ACTIVATE command 176, the column command 178 is issued, followed by precharge command 180 two cycles later. The third operation is performed in a like manner.

It is important to note that the prior art memory operations involving different banks never overlap. All commands are performed serially, thus wasting valuable clock cycles which could otherwise be used more productively. The present invention allows commands involving different banks to be overlapped when possible thus achieving a significant throughput increase.

In FIG. 6B, the requests are identical to those seen in FIG. 6A, but they are performed on an apparatus in accordance with the present invention.

Here, the present invention takes advantage of the fact that mandatory wait periods for one bank may be used to issue commands to a second bank. For example, ROW ACTIVATE command 182 may be issued one clock cycle after WRITE command 184, thus saving eight clock cycles over the prior art. Those of ordinary skill in the art would readily recognize that many such command overlaps may take place which were not performed in the prior art.

While embodiments and applications of this invention have been shown and described, it would be apparent to those skilled in the art that many more modifications than mentioned above are possible without departing form the inventive concepts herein. The invention, therefore, is not to be restricted except in the spirit of the appended claims.

What is claimed is:

1. An apparatus for processing memory access requests, comprising:
    an arbiter, said arbiter receiving a current memory access request and a next memory access request, and determining whether processing of said next memory access request will interfere with processing of said current memory access request;
    a first state machine for controlling access to a first memory bank, said first state machine processing said current memory access request to enable the first memory bank to be accessed;
    a second state machine for controlling access to a second memory bank, said second state machine, in response to a determination by said arbiter that processing of said next memory access request will not interfere with processing of said current memory access request, processing said next memory access request to enable the second memory bank to be accessed, said second state machine beginning processing of said next memory access request prior to completion of processing of said current memory access request by said first state machine,
    wherein the first state machine and the second state machine output a first set of control signals and a second set of control signals, respectively; and
    a logic component for performing an NOR operation on the first and second sets of control signals to derive a set of processed control signals and to provide the processed control signals to at least one of the first and second memory banks.

2. The apparatus of claim 1, wherein said first state machine implements at least one wait period prior to completing processing of said current memory request, and wherein said second state machine begins processing said next memory access request during said wait period.

3. The apparatus of claim 1, wherein said first and second sets of control signals comprise a row address strobe (RAS) signal, a column address strobe (CAS) signal, and a write enable (WE) signal.

4. The apparatus of claim 1, further comprising a storage element having a data input for receiving said set of processed control signals and a data output for providing said set of processed control signals to at least one of the first and second memory banks.

5. The apparatus of claim 1, further comprising:
    a multiplexer having a first input coupled to receive a first address associated with said current memory access request, a second input coupled to receive a second address associated with said next memory access request, a control input coupled to receive said set of processed control signals, and a multiplexer output coupled to at least one of the first and second memory banks, said multiplexer selectively coupling one of said first and second inputs to said multiplexer output in response to said set of processed control signals.

6. The apparatus of claim 5, further comprising a storage element having a data input coupled to said multiplexer output, and a data output coupled to at least one of the first and second memory banks.

7. The apparatus of claim 5, further comprising:
    compare logic, having a first input coupled to receive said first address, a second input coupled to receive said second address, and a logic output coupled to said first state machine and said second state machine, said compare logic comparing said first and second addresses and providing at said logic output an indication as to whether said current memory access request and said next memory access request are directed at different memory banks.

8. The apparatus of claim 7, further comprising:
    a storage element having a data input coupled to receive said second address, a data output for providing said first address, and a clock input for receiving a clock signal, said storage element responding to said clock signal by storing data appearing at said data input and providing said data at said data output.

9. The apparatus of claim 8, wherein said data output is coupled to said first input of said multiplexer, and to said first input of said compare logic.

10. The apparatus of claim 8, wherein said first state machine provides a first indication signal which is asserted when said first state machine initiates processing of any memory access request, and wherein said second state machine provides a second indication signal which is asserted when said second state machine initiates processing of any memory access request.

11. The apparatus of claim 10, further comprising:
   a logic element for performing an OR operation on said first and second indication signals to derive a processed indication signal, said processed indication signal being provided to said clock input of said storage element.

12. The apparatus of claim 11, further comprising:
   a second storage element having a data input coupled to receive said processed indication signal, a clock input coupled to receive said processed indication signal, and a data output, said second storage element responding to said processed indication signal by storing and providing said processed indication signal at said data of said second storage element.

13. The apparatus of claim 12, wherein said data output of said second storage element is coupled to a request manager which manages a queue of a plurality of memory access requests.

14. An apparatus for processing memory access requests, comprising:
   an arbiter, said arbiter receiving a current memory access request and a next memory access request, and determining whether processing of said next memory access request will interfere with processing of said current memory access request;
   a first state machine for controlling access to a first memory bank, said first state machine processing said current memory access request to enable the first memory bank to be accessed;
   a second state machine for controlling access to a second memory bank, said second state machine, in response to a determination by said arbiter that processing of said next memory access request will not interfere with processing of said current memory access request, processing said next memory access request to enable the second memory bank to be accessed, said second state machine beginning processing of said next memory access request prior to completion of processing of said current memory access request by said first state machine, wherein the first state machine and the second state machine output a first set of control signals and a second set of control signals, respectively;
   a power-up state machine for initiating operation of the first and second memory banks and for outputting a third set of control signals; and
   a logic component for performing an NOR operation on the first, second and third sets of control signals to derive a set of processed control signals and to provide the processed control signals to at least one of the first and second memory banks.

15. The apparatus of claim 14, further comprising:
   a multiplexer having a first input coupled to receive a first address associated with said current memory access request, a second input coupled to receive a second address associated with said next memory access request, a control input coupled to receive said set of processed control signals, and a multiplexer output coupled to at least one of the first and second memory banks, said multiplexer selectively coupling one of said first and second inputs to said multiplexer output in response to said set of processed control signals.

16. The apparatus of claim 15, further comprising:
   compare logic, having a first input coupled to receive said first address, a second input coupled to receive said second address, and a logic output coupled to said first state machine and said second state machine, said compare logic comparing said first and second addresses and providing at said logic output an indication as to whether said current memory access request and said next memory access request are directed at different memory banks.

17. The apparatus of claim 16, further comprising:
   a storage element having a data input coupled to receive said second address, a data output for providing said first address, and a clock input for receiving a clock signal, said storage element responding to said clock signal by storing data appearing at said data input and providing said data at said data output.

18. The apparatus of claim 17, wherein said first state machine provides a first indication signal which is asserted when said first state machine initiates processing of any memory access request, wherein said second state machine provides a second indication signal which is asserted when said second state machine initiates processing of any memory access request, and wherein said apparatus further comprising:
   a logic element for performing an OR operation on said first and second indication signals to derive a processed indication signal, said processed indication signal being provided to said clock input of said storage element.

* * * * *

UNITED STATES PATENT AND TRADEMARK OFFICE
CERTIFICATE OF CORRECTION

PATENT NO.     : 6,532,523 B1
DATED          : March 11, 2003
INVENTOR(S)    : Ramesh Mogili It is certified that error appears in the above-identified patent and that said Letters Patent is hereby corrected as shown below:

<u>Title page,</u>
Item [63], Filed: April 30, delete "2000" and insert -- 1999 --.

Signed and Sealed this

Fifth Day of October, 2004

JON W. DUDAS
*Director of the United States Patent and Trademark Office*